March 29, 1938.  R. J. CORRIGAN  2,112,396
CUT-OFF MACHINE
Filed April 18, 1936   2 Sheets-Sheet 1

INVENTOR.
Roy J. Corrigan
Barnes, Kisselle, Laughlin & Raisch
ATTORNEY.

March 29, 1938.  R. J. CORRIGAN  2,112,396
CUT-OFF MACHINE
Filed April 18, 1936  2 Sheets-Sheet 2
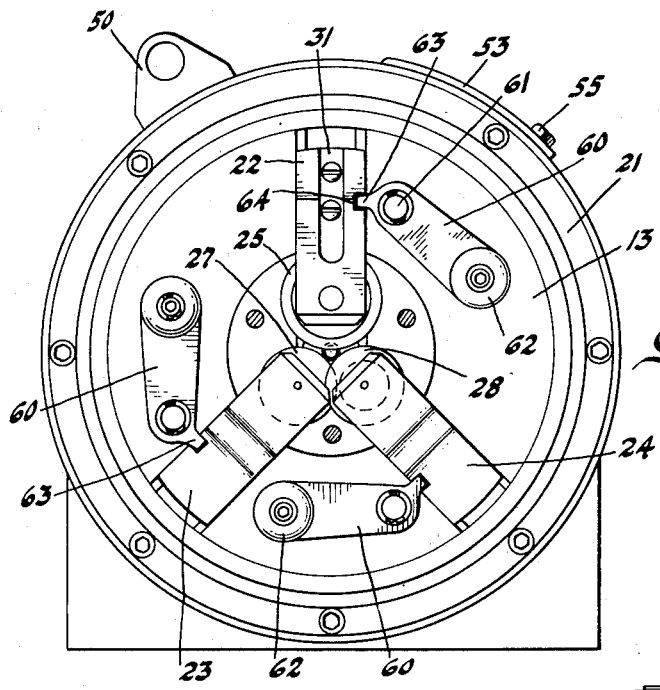
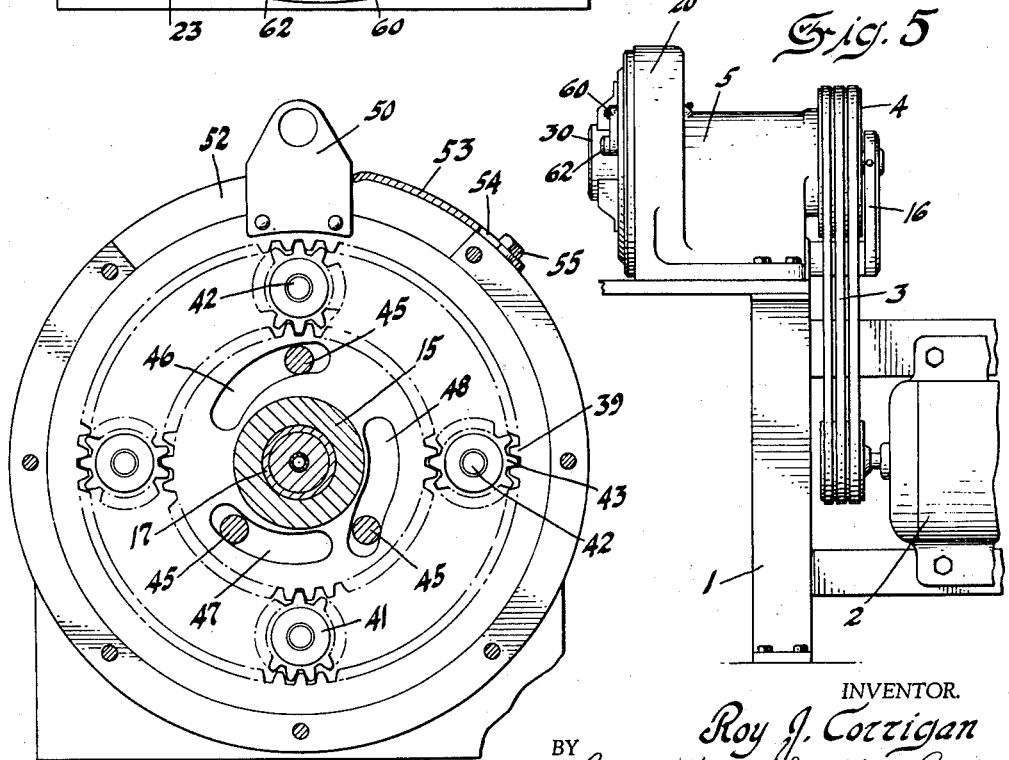
INVENTOR.
Roy J. Corrigan
BY Barnes, Kisselle, Laughlin & Raisch
ATTORNEY.

Patented Mar. 29, 1938

2,112,396

UNITED STATES PATENT OFFICE 2,112,396

CUT-OFF MACHINE

Roy J. Corrigan, Detroit, Mich., assignor to Bundy Tubing Company, Detroit, Mich., a corporation of Michigan Application April 18, 1936, Serial No. 75,190

6 Claims. (Cl. 164—60)

This invention relates to a machine for cutting off portions from a long length of material. It has to do especially with a cut-off machine suitable for cutting lengths from metal stock, particularly in the form of a tube, wire, bar stock or the like. The device shown herein, for the purpose of exemplifying the invention, is designed especially for cutting tubing.

One of the objects of the invention is to provide a cut-off machine which will minimize, and for all practical purposes, substantially eliminate the presence of a burr on the ends of the severed pieces. This is particularly desirable in tubing where it is desired to have no inwardly projecting burr, or outwardly projecting burr for that matter, so that the tube ends may be advantageously assembled by connection to other devices or tube lengths with suitable fittings or the like. To this end the invention provides a rotary cutter designed to revolve at a fairly high rate of speed and which includes a cutting instrument which revolves bodily around the length of material to be cut. Means are provided for shifting the cutting instrument to bring it into and out of cutting relation with the material, at which time it is revolving around the material to be cut at a fairly high rate of speed, so that a nice clean cut is provided by successively deepening the cut groove circumferentially around the stock. A further object is to provide a cutting machine for cutting off stock wherein the stock is held stationary; that is to say the stock does not rotate.

In a rotary machine of this kind centrifugal forces must be dealt with. In the shifting of the cutting instrument, while it is bodily rotating, centrifugal forces are met, and the invention has a further object the provision of a structure wherein the centrifugal forces are balanced out, or substantially balanced out, thus to make for ease of operation. The machine also includes elements movable for backing up the metal to be cut when the cutting element is operating thereon; these likewise are shiftable, and the centrifugal forces on these elements are likewise substantially balanced out.

In the accompanying drawings:

Fig. 3 is a sectional view similar to Fig. 2 illustrating some of the parts in cutting position.

Fig. 4 is a sectional view taken substantially on line 4—4 of Fig. 1.

Fig. 5 is a general side elevational view of the machine.

Figure 1:
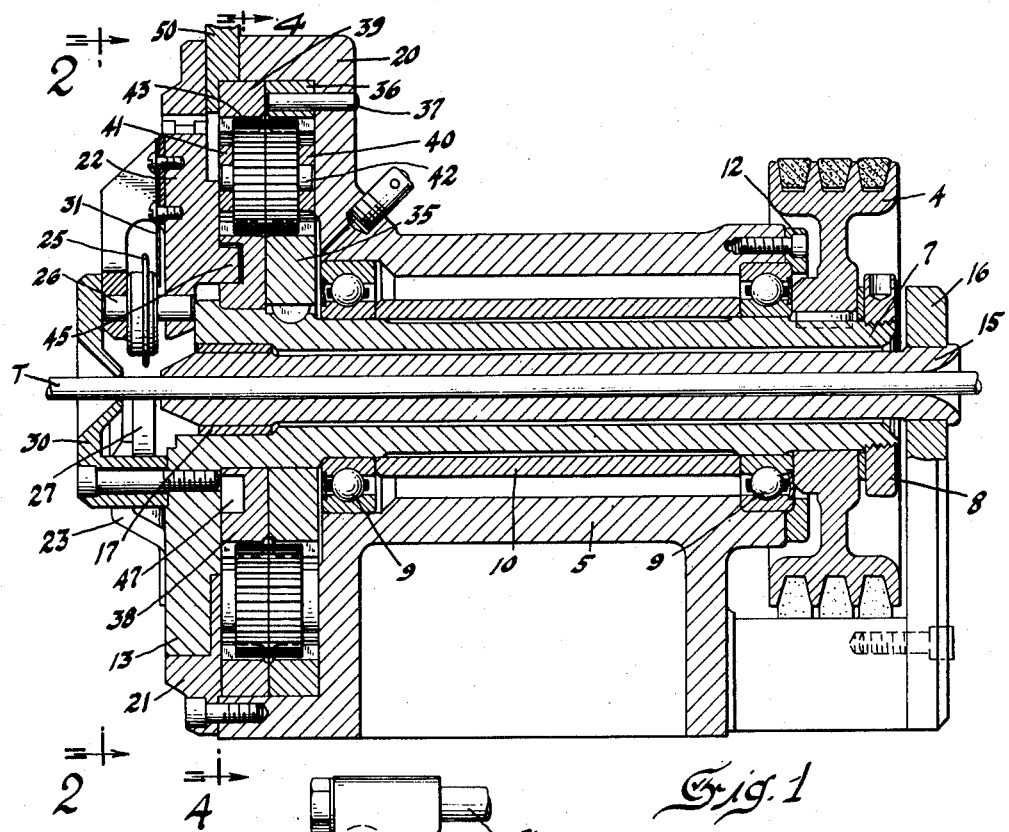
Fig. 1 is a cross sectional view taken through a device constructed in accordance with the invention.

The device, as shown in Fig. 5, may be mounted upon a suitable support 1 and driven by a motor 2 through the means of one or more belts 3, operating over a pulley 4. The device has a frame or housing part 5.

Referring now to Fig. 1, it will be noted that the pulley 4 is keyed to a member 7 and held thereon by a suitable element 8. The member 7 is journaled in the housing 5, advantageously by means of antifriction bearings 9 located by a spacer element 10 and retained at one end by a holding ring 12. The member 7 extends substantially through the outer housing and has an enlarged end 13 which, as will be presently brought out, supports the cutting instrument and the cooperating backing instruments.

Element 7 is of tubular form, and extending therethrough is a tube guide member 15. This member may be supported at one end by a suitable bracket 16 and journaled in the member 10 at its opposite end, by means of a bearing 17. The tube to be acted upon is illustrated at T and the member 15 has a central aperture therethrough designed to receive the tube. The aperture in the member 15 preferably varies with the size of the tube to be acted upon, and indeed the member 15 may be interchangeable with others for accommodating different sizes of tubes. This may be done by releasing the member at its bracketed end and withdrawing it.

Figure 2:
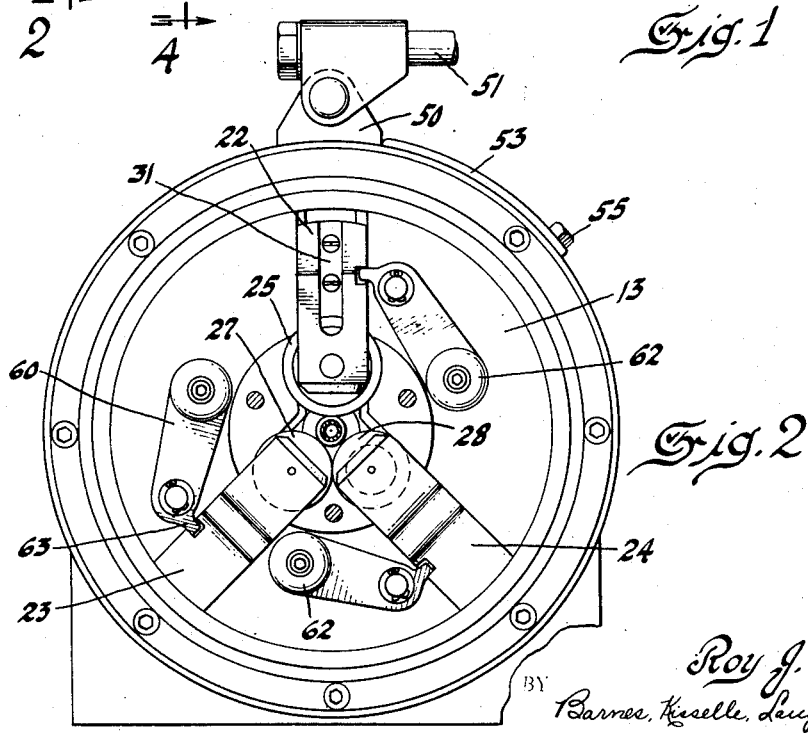
Fig. 2 is a sectional view taken substantially on line 2—2 of Fig. 1.

One end of the housing 5 has an enlarged part as at 20 for housing the controlling mechanism which is in the nature of a planetary gearing, and this part of the housing may be partially closed by the ring element 21. The head 13 of the rotary element is arranged to carry the instruments for acting upon the tube. To this end the head may be slotted preferably in a radial direction, as shown in Fig. 2, and in the slots are slidably mounted blocks 22, 23, and 24. In the present form there are three of such blocks and one carries a cutting element, and the other two carry elements for backing up the cutting element. As shown in Fig. 1 the block 22 has spaced parts between which is mounted a cutting element in the form of a disc knife 25 journaled on a pin 26. The body of the disc knife may be of relatively heavy roller form with the edge sharpened for cutting. The blocks 23 and 24 are similar to the block 22 and each carries a backing roller as shown at 27 and 28. An end piece 30 is centrally located and secured to the head 13, and it may be fitted over the blocks and apertured to receive and guide the tube, as shown. Thus the tube is supported on opposite sides of and adjacent the place of cutting. For controlling the rotary action of the knife on its own axis the block 22 may carry a leaf spring element 31 for engaging the same as shown in Fig. 1 and placing a tension thereon.

These blocks are shiftable toward and away from the tube which, as will be noted, is substantially radially. The controlling mechanism for so moving these blocks is housed principally in the enlarged portion 20 of the casing. This mechanism is as follows: There is a gear 35 keyed to the rotary member 7 and having external gear teeth. There is an internal gear 36 held stationary to the housing as by means of one or more pins 37. There is another gear with external teeth placed alongside the gear 35. This gear is shown at 38 and is free to be shifted rotatably relative to the rotary member 7 and the housing. This gear 38 may be mounted on the member 7 as shown. Similarly, there is a second internal gear 39 likewise free for rotary movement relative to the housing, as well also as the rotary member 7.

Between these external and internal gears are pinions or small gears, of which there may be four sets, as shown in Fig. 4. For this purpose there is a holding ring 40 and a holding ring 41 which carry journal pins 42. Two of such pinions or small gears are mounted on each pin, as shown in Fig. 1; one pinion in each set, as for example, the pinion 42, has its teeth in mesh with the teeth on the gears 35 and 36; the other, 43, has its teeth in mesh with the teeth on the gears 38 and 39.

Each of the blocks 22, 23 and 24 has a stud 45, each located in a closed cam groove in the ring gear 38. This will be noted by reference to Fig. 4. The cam groove for the knife is illustrated at 46 and the grooves for the two backing rollers are illustrated at 47 and 48. It will be noted that the cam groove for operating the knife is of relative uniform formation, while the grooves 47 and 48 each have a portion inclining inwardly toward the axis of the machine, and a portion concentric to the axis of the machine.

An operating piece 50 is connected to the internal ring gear 39 and it projects out of the housing 5 and may be equipped with a suitable structure 51 by means of which it may be shifted. The piece 50 projects out through a slot 52 formed between the enlarged portion 20 of the housing, and the ring 21, and its movement is limited by the dimension of the slot. In fact, the slot formed in the housing may be of appreciable length, as illustrated in Fig. 4, the effective length of the slot being determined by an adjustable closing piece 53. This piece may be mounted for adjustment as by means of being provided with an elongated slot 54 through which a suitable cap screw or the like is taken.

For balancing out the centrifugal force on the shiftable blocks 22, 23 and 24, unbalanced centrifugal masses are provided which cooperate with the blocks. This structure may take the form of an arm 60 pivoted to the head 13 as at 61 and having a suitably weighted end 62 which constitutes an unbalanced centrifugal mass. The arm is suitably connected to a block. This may be accomplished by providing a projecting nose piece 63 fitting preferably somewhat loose in a recess in the block. Where there are three blocks there may be three counter-balancing centrifugal weights as shown in Fig. 3.

In the operation of the device, a suitable length of material such as the tube T is fed into the same by hand, or automatically, and when properly located the cutting mechanism is operated to cut the tube. First, assume that the rotary parts are stationary; in this condition if the operating member 50 is shifted to the left, as Figs. 2 and 4 are viewed, ring gear 39 is similarly shifted. However, the ring gears 35 and 36 are stationary relative to each other and therefore the journal pins 42 cannot move. The result is that the pinions 43 revolve and in so doing turn the external gear 38 relative to the member 7 and its head 13. The gear 38 will rock clockwise as Fig. 4 is viewed. This causes the blocks 22, 23 and 24 to shift radially inwardly by reason of the cam slots 46, 47 and 48 and the knife edge is brought into engagement with the tube, and the backing rollers are brought into engagement with the tube.

In the initial movement the cam slots 47 and 48 for controlling the backing rollers shift the backing rollers against the tube and then the studs on the roller blocks enter the arcuate portions of these cam slots so that the backing rollers are held against the tube. However, while the rollers are thus held, the knife continues its inward movement to cut the metal stock.

Now a similar action takes place when the machine is rotating, at which time there is a predetermined relation between the rotating gear 35 and the stationary gear 36, with the result that the pinions are revolving on their respective axes and bodily around the axis of the machine. At this time the gear 38 is rotating with the head 13 and other rotating parts, and the internal gear 39 is stationary. When the operating member is shifted to shift member 39, this relationship is disturbed, and since the pins 42 are held in a definite relationship to the gears 35 and 36, the pinions 43 are caused to rotate on their journal pins differently from the rotation of the gears 42, thus causing a rocking movement of the external ring gear 38 and a shifting of the cutting instrumentalities.

The machine is preferably intended to rotate at a relatively high R. P. M. so that the cutting knife bodily rotates around the tube speedily to perform a knife cut gradually increasing in depth, in which action it will be noted that the cutting knife may rotate on its own axis. However, at this time there is a considerable centrifugal force effective upon the blocks which tend to throw them outwardly. This force may be substantial at high R. P. M. and would have to be overcome in operating the device to cut the tube. To overcome this, the unbalanced weighted levers are arranged to exert a centrifugal force in opposition to that of the blocks. The arrangement may be such that the centrifugal forces are substantially balanced out so that a nice easy operating action can be obtained, with the resistance thereto provided substantially only by that required to cut through the metal of the tube or other length of stock.

I claim:

1. A cut-off apparatus for tubes or other long lengths of stock comprising, a rotary member, a cutting element carried by the rotary member, guide means for the stock positioned within and substantially concentric to the rotary member, said guide means having a central opening substantially on the axis for receiving a length of stock and in which the stock is adjustable lengthwise, whereby the cutting element moves bodily around the stock, means for shifting the cutting element in a direction toward and away from the axis to bring the cutting element into and out of cutting relation with the stock, and unbalanced centrifugal weight means associated with the cutting element for substantially balancing out the centrifugal forces thereon.

2. A cut-off apparatus for tubes or other long lengths of stock comprising, a rotary member, means for receiving and guiding the stock, the stock being positioned substantially on the axis of the rotary member, a cutting element on the rotary member, backing means on the rotary member normally spaced from the stock, means mounting the cutting element and backing means on the rotary member for movement toward and away from the stock, means for shifting the backing means into backing relation with the stock and the cutting element into cutting relation with the stock, while the same are rotating bodily with the said rotary means, and unbalanced centrifugal weight means associated with the cutting element and backing means for substantially balancing out the centrifugal forces thereon.

3. A cutting apparatus for tubing or other long lengths of stock comprising, a rotary member, guide means for receiving and guiding the stock substantially on the axis of the said rotary member, a plurality of carriers mounted on the rotary member for movement toward and away from the axis, a disc-type cutting element journaled on one carrier, backing means normally spaced from the stock and carried by another carrier, means operable while the rotary member is operating and the cutting element and backing means are revolving bodily around the stock for shifting the carriers to bring the cutting element into cutting relation with the stock and the backing means into backing engagement with the stock, and unbalanced centrifugal weight means associated with the carriers for substantially balancing out centrifugal forces thereon.

4. A cutting apparatus for tubing or other long lengths of stock comprising, a rotary member, guide means for receiving and guiding the stock substantially on the axis of the said rotary member, a plurality of carriers mounted on the rotary member for movement toward and away from the axis, a disc-type cutting element journaled on one carrier, a backing roller normally spaced from the stock and journaled on another carrier, and means operable while the rotary member is operating and the cutting element and roller are revolving bodily around the stock for shifting the carriers to bring the cutting element into cutting relation with the stock and the roller into backing engagement with the stock.

5. A cutting apparatus for tubing or other long lengths of stock comprising, a rotary member, guide means for receiving and guiding the stock substantially on the axis of the said rotary member, a plurality of carriers mounted on the rotary member for movement toward and away from the axis, a disc-type cutting element journaled on one carrier, a plurality of backing rollers normally spaced from the stock, one journaled on each of the other carriers and positioned generally on the opposite side of the stock from the cutting element, and means operable while the rotary member is operating and the cutting element and rollers are revolving bodily around the stock for shifting the carriers to bring the cutting element into cutting relation with the stock and the rollers into backing engagement with the stock.

6. A cut-off apparatus for tubing or other long lengths of stock comprising, a rotary member having a supporting head, means for receiving and guiding a length of stock substantially on the axis of the rotary member, a carrier mounted on the supporting head and arranged to shift toward and away from the axis, a cutting element on the carrier, two other carriers on the supporting head positioned generally on the opposite side of the stock from the first mentioned carrier and arranged to shift toward and away from the axis, backing means on the said two other carriers and normally spaced from the stock for engaging and backing the stock against the action of the cutting element, means operable while the supporting head is rotating for substantially simultaneously moving the carriers toward the axis to bring the cutting element into cutting relation with the stock and to bring the backing means into backing relation with the stock, and a plurality of members pivotally mounted on the supporting head, there being one of such members for each carrier, said members including unbalanced centrifugal masses and each operably connected to a carrier for substantially balancing out the centrifugal forces on the carriers.

ROY J. CORRIGAN.